United States Patent
Fujimoto et al.

[11] Patent Number: 5,930,385
[45] Date of Patent: Jul. 27, 1999

[54] APPARATUS AND METHOD FOR IMAGE CONVERSION

[75] Inventors: Masakazu Fujimoto; Tsuyoshi Tanaka, both of Nakai-machi, Japan

[73] Assignee: Fuji Xerox Co., Ltd., Tokyo, Japan

[21] Appl. No.: 08/632,527

[22] Filed: Apr. 15, 1996

[30] Foreign Application Priority Data

May 18, 1995 [JP] Japan .................................. 7-142378

[51] Int. Cl.⁶ .................................................. G06K 9/00
[52] U.S. Cl. ......................... 382/162; 382/164; 382/167; 358/518
[58] Field of Search ..................... 382/162, 167, 382/164; 352/38, 129; 348/552; 355/40; 358/518, 534, 455; 112/102.5

[56] References Cited

U.S. PATENT DOCUMENTS 5,191,444  3/1993  Harada et al. ......................... 358/455
5,321,532  6/1994  Ishikawa et al. ....................... 358/534
5,557,688  9/1996  Nakamura .............................. 382/164

FOREIGN PATENT DOCUMENTS

A-62-105276  5/1987  Japan .............................. G06F 15/62
A-6-208357   7/1994  Japan .............................. G06F 15/20
A-7-121733   5/1995  Japan .............................. G06T 11/60

Primary Examiner—Jose L. Couso
Assistant Examiner—Anh Hong Do
Attorney, Agent, or Firm—Oliff & Berridge, PLC

[57] ABSTRACT

An apparatus and method for image conversion including in particular an apparatus and method for color image conversion for changing the number of colors used in a multi-colored document and for image conversion for changing the number of gradations of monochrome document or converting the monochrome document into a multi-colored document.

20 Claims, 17 Drawing Sheets

| Pixel i | Pixel j |
| $(R_i, G_i, B_i)$ | $(R_j, G_j, B_j)$ |

$$(R_i-R_j)^2 + (G_i-G_j)^2 + (B_i-B_j)^2 < k$$

(10,10)
(30,20)
(20,40)
(40,40)

| Region Number | Circumscribing Rectangle | | | | Image Data (Pointer) | Form Mask (Pointer) | Adjacency List (Pointer) | Color Determination Data | |
|---|---|---|---|---|---|---|---|---|---|
| | Top | Left | Bottom | Right | | | | Determination-Finished Flag | Color Number |
| 1 | 0 | 0 | 3564 | 2520 | 1000 | 11000 | 0 | 0 | 0 |
| 2 | 205 | 55 | 552 | 2211 | 2000 | 12000 | 0 | 0 | 0 |
| ... | | | | | | | | | |
| 5 | 1309 | 55 | 3488 | 2210 | 5000 | 15000 | 0 | 0 | 0 |
| ... | | | | | | | | | |
| 10 | 633 | 1624 | 784 | 1861 | 10000 | 20000 | 0 | 0 | 0 |
| 11 | 633 | 1861 | 784 | 2065 | 10500 | 20500 | 0 | 0 | 0 |

91 92 93 94 95 96

FIG. 10
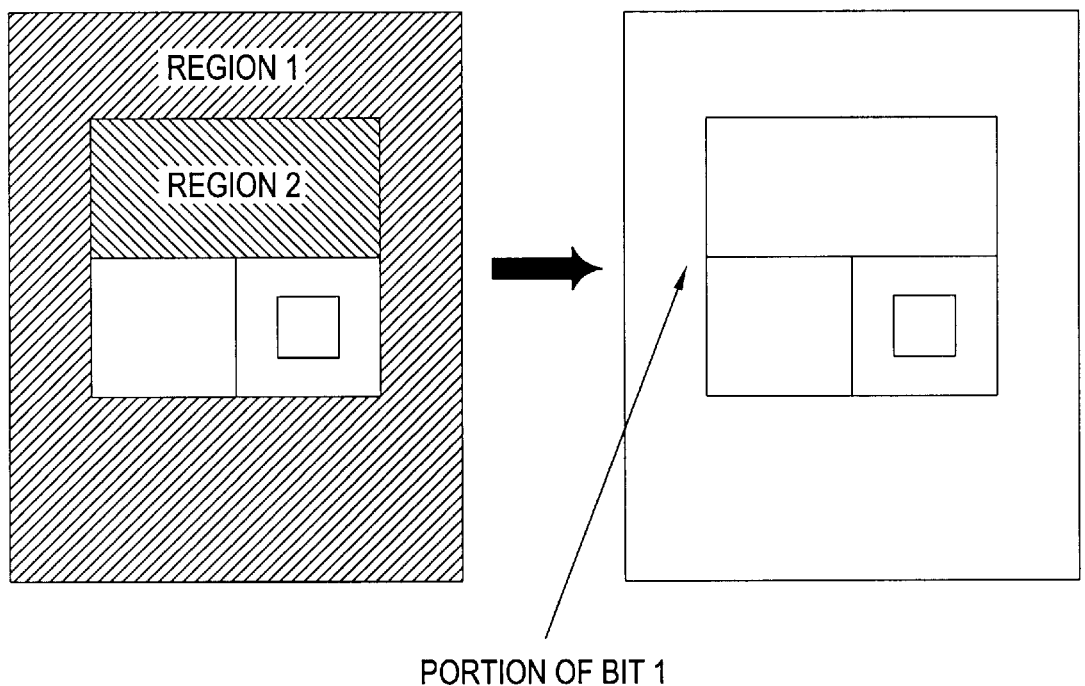
PORTION OF BIT 1
ADJACENCY LIST OF REGION 1
ADJACENCY LIST OF REGION 2

FIG. 12
Adjacency List of Region 1
| 2, 3, 4, 5, 6, 7, 8, 9 |
| 1, 2, 3, 4, 5, 6, 7, 8, 9 |
Adjacency List of Region 2
| 1, 3, 4 |
| 1, 2, 3, 4 |
AND
| 1, 2, 3, 4 |

FIG. 16

| Region Number | Circumscribing Rectangle | | | | Image Data (Pointer) | Form Mask (Pointer) | Adjacency List (Pointer) | Color Determination Data | |
|---|---|---|---|---|---|---|---|---|---|
| | Top | Left | Bottom | Right | | | | Determination-Finished Flag | Color Number |
| 1 | 0 | 0 | 3564 | 2520 | 1000 | 11000 | 21000 | 1 | 1 |
| 2 | 205 | 55 | 552 | 1211 | 2000 | 12000 | 22000 | 1 | 1 |
| ⋮ | | | | | | | | | |
| 5 | 1309 | 55 | 3488 | 2210 | 5000 | 15000 | 25000 | 1 | 1 |
| ⋮ | | | | | | | | | |
| 10 | 633 | 1624 | 784 | 1861 | 10000 | 20000 | 30000 | 1 | 2 |
| 11 | 633 | 1861 | 784 | 2065 | 10500 | 20500 | 30500 | 1 | 3 |
| 12 | 205 | 55 | 876 | 2211 | 40000 | 41000 | 42000 | 1 | 2 |
| 13 | 1309 | 55 | 3488 | 2211 | 43000 | 44000 | 45000 | 1 | 2 |

APPARATUS AND METHOD FOR IMAGE CONVERSION

BACKGROUND OF THE INVENTION

1. Field of the Invention

The present invention relates to an apparatus and method for image conversion and in particular relates to an apparatus and method for color image conversion for changing the number of colors used in a multi-color document and image conversion for changing the number of gradations of a monochrome document or converting the monochrome document into a multi-color document.

2. Discussion of the Related Art

By the spread of a color printer or a full-color copying machine having an edit function or the like, a circulation rate of the color document has been recently raised. However, a monochrome printer and a monochrome copying machine are still mainstream, and accordingly, there are many cases of making a copy of a color document by the monochrome copying machine or printing a color image edited with a color CRT by the monochrome printer. In outputting by the ordinary monochrome printer or monochrome copying machine, only value information of color information of input document is used. Therefore, if two regions having almost no difference in value, though differ in hue or chroma, are adjacent to each other, these regions cannot be distinguished in the output document. The applicant of the present invention has suggested an apparatus for automatic conversion of color region of a document into a hatched region disclosed in Japanese patent application unexamined publication No. Hei. 6-208357 (1994) and an apparatus for automatic conversion of a color character in a document into a monochrome character of a larger size disclosed in Japanese patent application unexamined publication No. Hei. 7-121733 (1995). These inventions enable the output of a document converted into a monochrome one in which adjacent regions can be distinguished.

Since the quality of color arrangement or likes or dislikes of a receiver is taken into consideration, it is difficult for ordinary users to convert a monochrome document into a color document. Therefore, documents with bad color arrangement are often seen, and besides, there are many cases that the receiver of a document dislikes its color arrangement. As a result, sometimes operation of restoring the color document to monochrome status is required for re-edit.

In the above-described inventions disclosed in Japanese Patent Application Unexamined Publications Nos. Hei 6-208357 and Hei. 7-121733, only the output of monochrome-completed document is supposed, and accordingly, if an obtained document is desired to be re-colored by a color copying machine or the like, it is necessary to remove hatching, or carry out contraction or enlargement of character size. Even in the case of re-color of a document having only monochrome density information such as obtained by copying a color document by the ordinary monochrome copying machine, the density information must be removed. The information regarding hatching, character size and density to be removed has a purpose of distinguishing regions; therefore, removal of information and coloring should be simultaneously executed on every region, thus requiring much labor for re-coloring.

Limitation is imposed on the output device in the case of not only a monochrome output device but also a +1 color or +N color output device. In such a case, a third color cannot be effectively used because it is supposed in the above-described inventions of Japanese Patent Application Unexamined Publications Nos. Hei. 6-208357 and Hei. 7-121733, that the output image is printed in two colors. There is a technique generally called quantizing of an image, representative of which is an invention disclosed by Japanese Patent Application Unexamined Publication No. Sho 62-105276 (1987). However, in this technique, similar colors in a image having successive color distribution such as a photograph are integrated into one color; consequently, in the case of conversion into a small number of colors, for example, three colors, high risk of wrongly integrating colors which should be clearly distinguished into the same color occurs.

To carry out re-coloring, solid color should be used or only a frame should be left instead of using hatching, a dither pattern, changing of size or displaying gradations. The solid color can be converted into another color with ease by, for example, color conversion function of a color copying machine. In the case where only the frame is left in the document, coloring can be easily realized by using, for example, coloring function of the color copying machine.

From a viewpoint of easy coloring, a general method of edge extraction can be considered. However, portions which are better to be left as they were, such as characters, are also changed into outlines, thus deteriorating appearance of the document.

SUMMARY OF THE INVENTION

The present invention has been made in view of the above circumstances and has as an object of provision of an apparatus and method for image conversion capable of distinguishing regions in an input document which are adjacent to each other and have a little difference in value in reducing the number of colors in a document or in converting it into a monochrome document, and moreover, capable of producing a document with fine appearance which can be easily re-colored.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image conversion apparatus of the present invention comprises color image inputting means for inputting a color image of N-color, region detecting means for detecting plural regions having the same color in the color image input by the color image inputting means, adjacency determination means for determining whether a first region and at least one region other than the first region both detected by the region detecting means are adjacent to each other, and boundary line addition means for adding a boundary line to the first region, the boundary line being an outline of the first region, if the number of at least one region other than the first region determined by the adjacency determination means to be adjacent to the first region is more than M, wherein N is a natural number equal to or more than 3 and M is a natural number less than N and equal to or more than 2.

An image conversion method of the present invention comprises the steps of a) inputting a color image of N-color, b) detecting plural regions having the same color in the color image input in step a), c) determining whether a first region and at least one region other than the first region both detected in step b) are adjacent to each other, and d) adding a boundary line to the first region, the boundary line being an outline of the first region, if the number of at least one region other than the first region determined in step c) to be adjacent to the first region is more than M, wherein N is a natural number equal to or more than 3 and M is a natural number less than N and equal to or more than 2.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 10 shows an example of a result of processing for obtaining a contact line between regions;

FIG. 12 shows an example of calculation of AND set by reading the adjacency list;

FIG. 16 shows an example of data structure in the case where the input image shown in FIG. 7 is converted into an image of three colors.

DETAILED DESCRIPTION OF THE PREFERRED EMBODIMENT

Preferred embodiment of an image conversion apparatus according to the present invention is now described in detail based on the drawings.

Figures 8A, 8B:
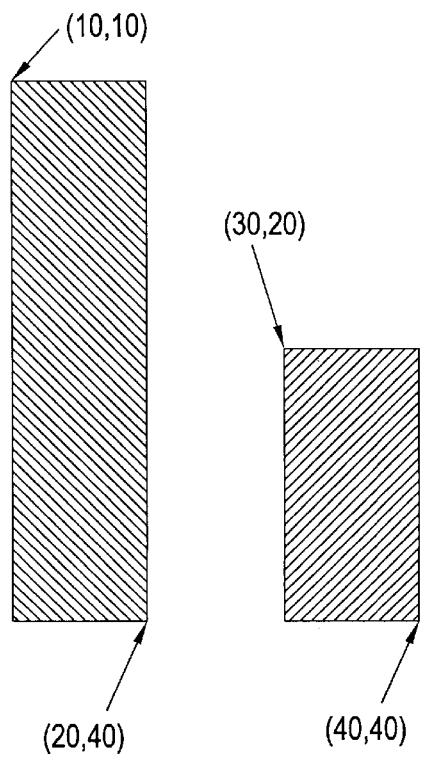
FIG. 8(a) shows an example of a method of distinguishing differences in colors of pixels.
FIG. 8(b) shows an example of a result of processing for obtaining regions adjacent to each other from an adjacency list.

In this embodiment, "same color" includes the case where the digital pixel values are slightly different from one another, as well as the case of being completely the same. An example of the case of different pixel values is later described in detail with reference to FIG. 8(a).

A case where a result of AND operation is true generally means that both of two factors of AND operation are true, and in the embodiment, concretely means that the result of AND operation is 1.

First Embodiment

Figure 1:
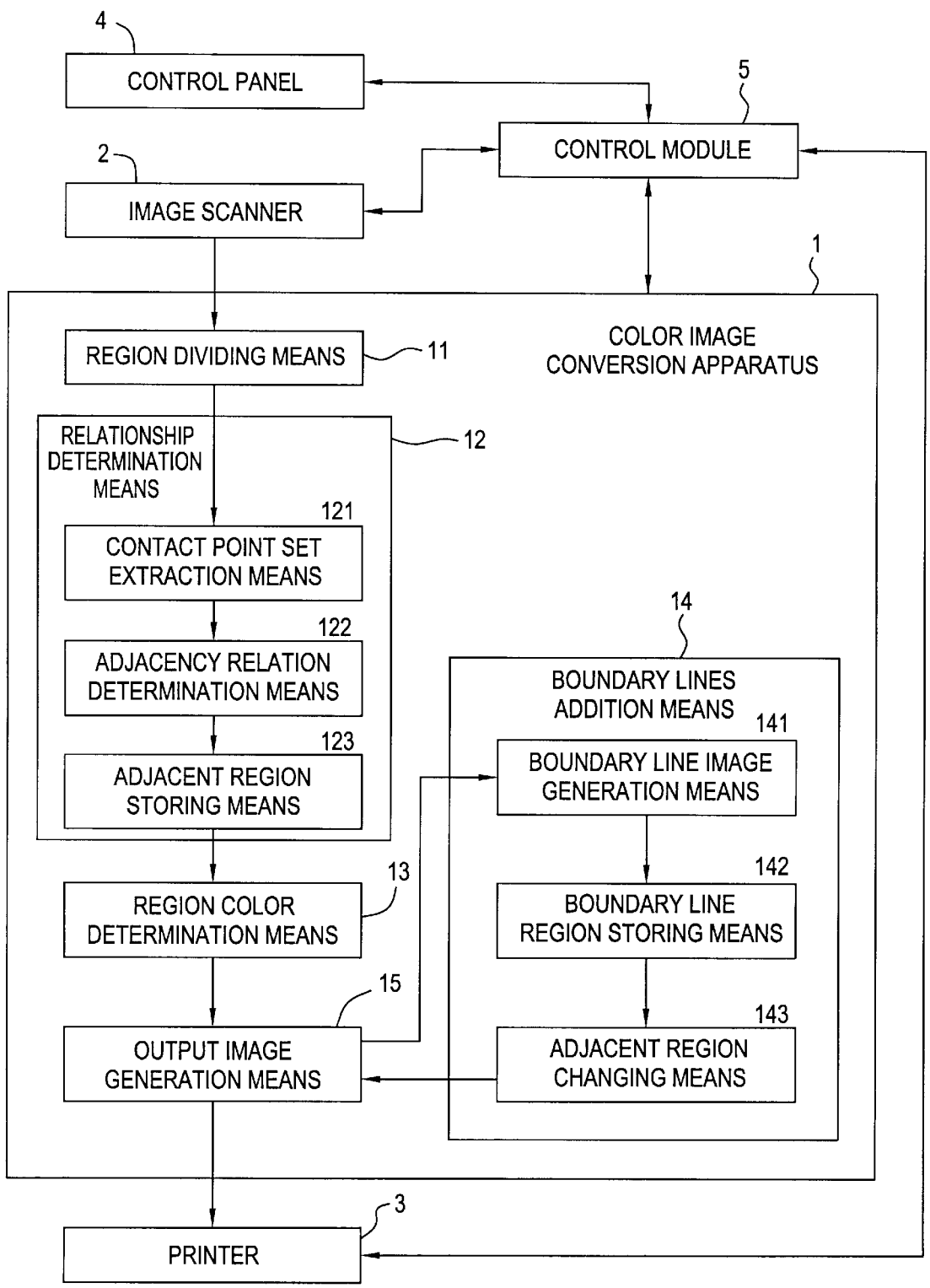
FIG. 1 shows a construction example of an embodiment of a color image conversion apparatus according to the present invention.

FIG. 1 shows a construction of an embodiment according to the present invention.

A color image conversion apparatus 1 comprises region dividing means 11 for dividing a color image into regions, relation determination means 12 for determining whether there is a specific relation between the divided regions of the color image, region color determination means 13 for determining the color of the region, boundary line addition means 14 for adding a boundary line to contacting portion between adjacent divided regions of the color image based on the result of determination by the relation determination means 12 and output image generating means 15 for generating an output image.

The constituents of the color image conversion apparatus 1 are described in detail.

The region dividing means 11 divides the input image so that pixels having the same color and adjacent to one another constitute one region based on color information and coordinates information.

The relation determination means 12 has contact point set extraction means 121, adjacency relation determination means 122 and adjacent region storing means 123. The contact point set extraction means 121 extracts a set of pixels contacting each region divided by the region dividing means 11. The adjacency relation determination means 122 determines whether two regions are adjacent to each other by examining overlap of a set of pixels contacting the region extracted by the contact point set extracting means 121 and another region. If two regions are adjacent to each other, the adjacent region storing means 123 stores the adjacent counterpart in the list of each region which shows adjacency relation if two regions are adjacent to each other.

The region color determination means 13 compares the number of regions adjacent to each other and the number of available colors to determine the colors of regions. If the number of available colors is less than the number of regions, the region color determination means 13 adds the boundary lines so that the number of colors may be sufficient for determining the colors of the regions.

The boundary line addition means 14 comprises boundary line image generation means 141 for generating an image of boundary line between regions, boundary line region storing means 142 for storing the generated image of boundary line as one of the divided regions, and adjacent region changing means 143 for modifying adjacency relation in the list changed by addition of the boundary line image.

The output image generation means 15 generates an output image in which the colors are changed in accordance with the region colors determined by the region color determination means 13.

An image scanner 2 inputs a document image to the color image conversion apparatus 1, and a printer 3 prints the output image generated by the output image generation means 15. The user can carry out operation by a control panel 4. A control module 5 generally controls every component.

With the above construction, the color image conversion apparatus operates as follows. The contact point set extracting means 121 extracts a set of points contacting a region of an image divided by the region dividing means 11. The adjacency relation determination means 122 carries out AND between the set of points and another region to determine whether two regions are adjacent to each other. With respect to the regions determined to be adjacent to each other, the adjacency region storing means 123 stores a region number of the adjacent counterpart in the list of each region showing the adjacency relation. The region color determination means 13 reads the list showing the adjacency relation and compares the number of colors predetermined to color and distinguish the regions with the number of adjacent regions including the target region. If the number of adjacent regions is less than the number of predetermined colors, a color for each region is determined. On the contrary, if the number of the adjacent regions is more than the number of the predetermined colors, the boundary line image generation means 141 generates boundary line images to be added to the contacting portion between regions. The boundary line region storing means 142 stores the boundary line image to be added as a new region. The adjacent region changing means 143 updates the list showing the adjacency relation and determines the color of the boundary line stored in the boundary line region storing means 142. According to the above method, it is possible to color and distinguish all regions with colors of the predetermined number.

In the following description, operation is further explained in detail using an example of conversion of a color image into monochrome image by a digital copying machine.

Figure 2:
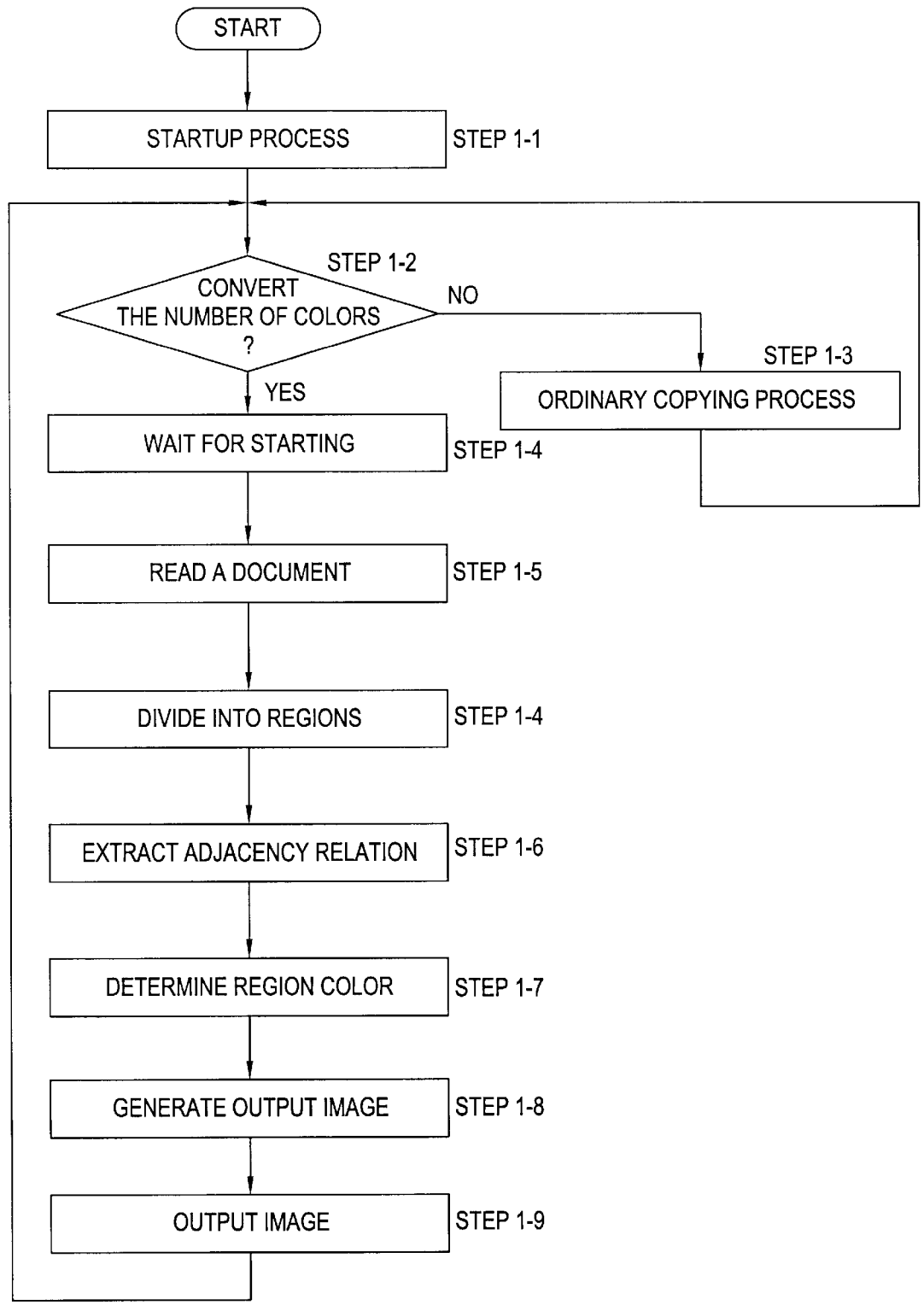
FIG. 2 shows a flow of whole processing in the case where color image conversion is applied to a copying machine.
Figure 3:
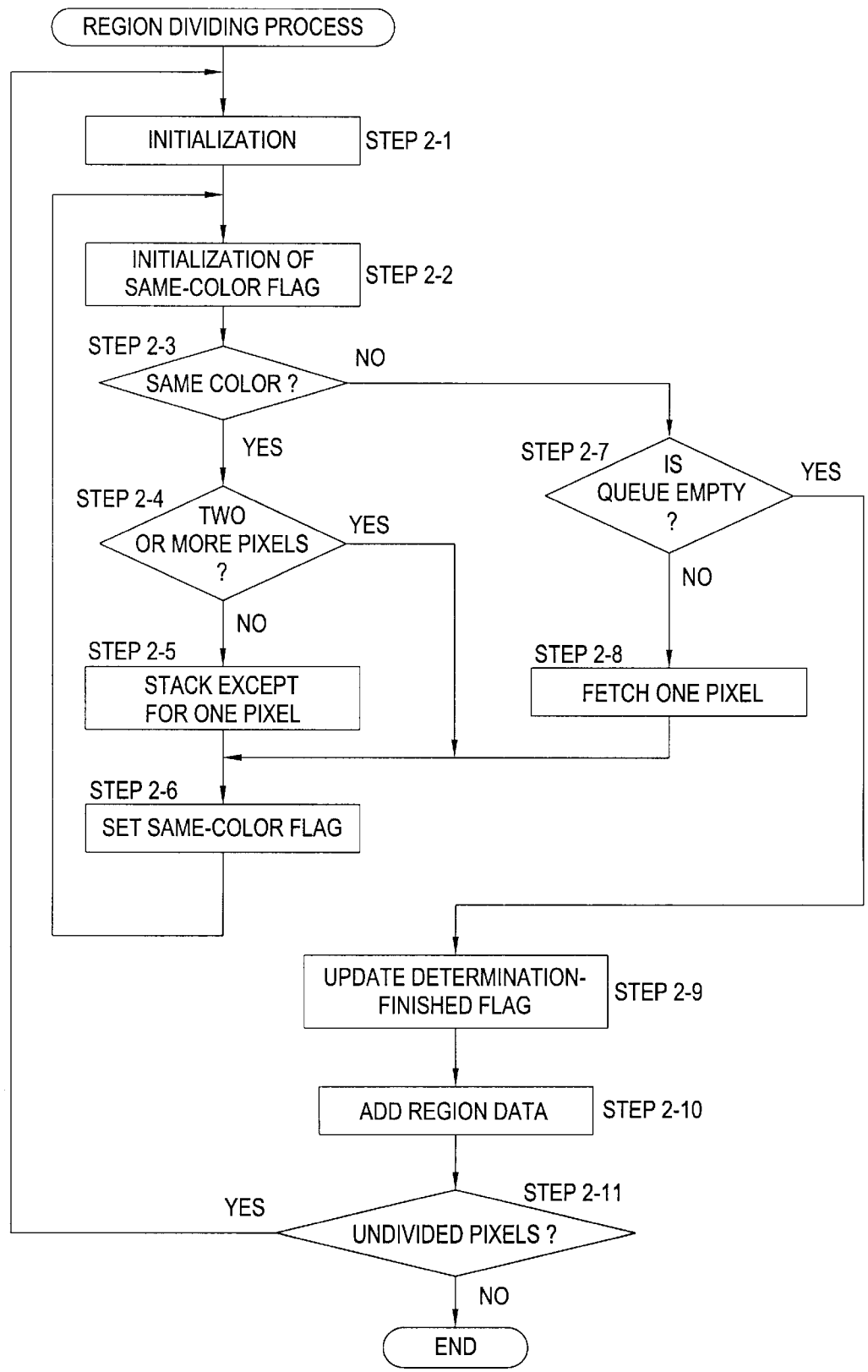
FIG. 3 shows a flow of region dividing process.
Figure 4:
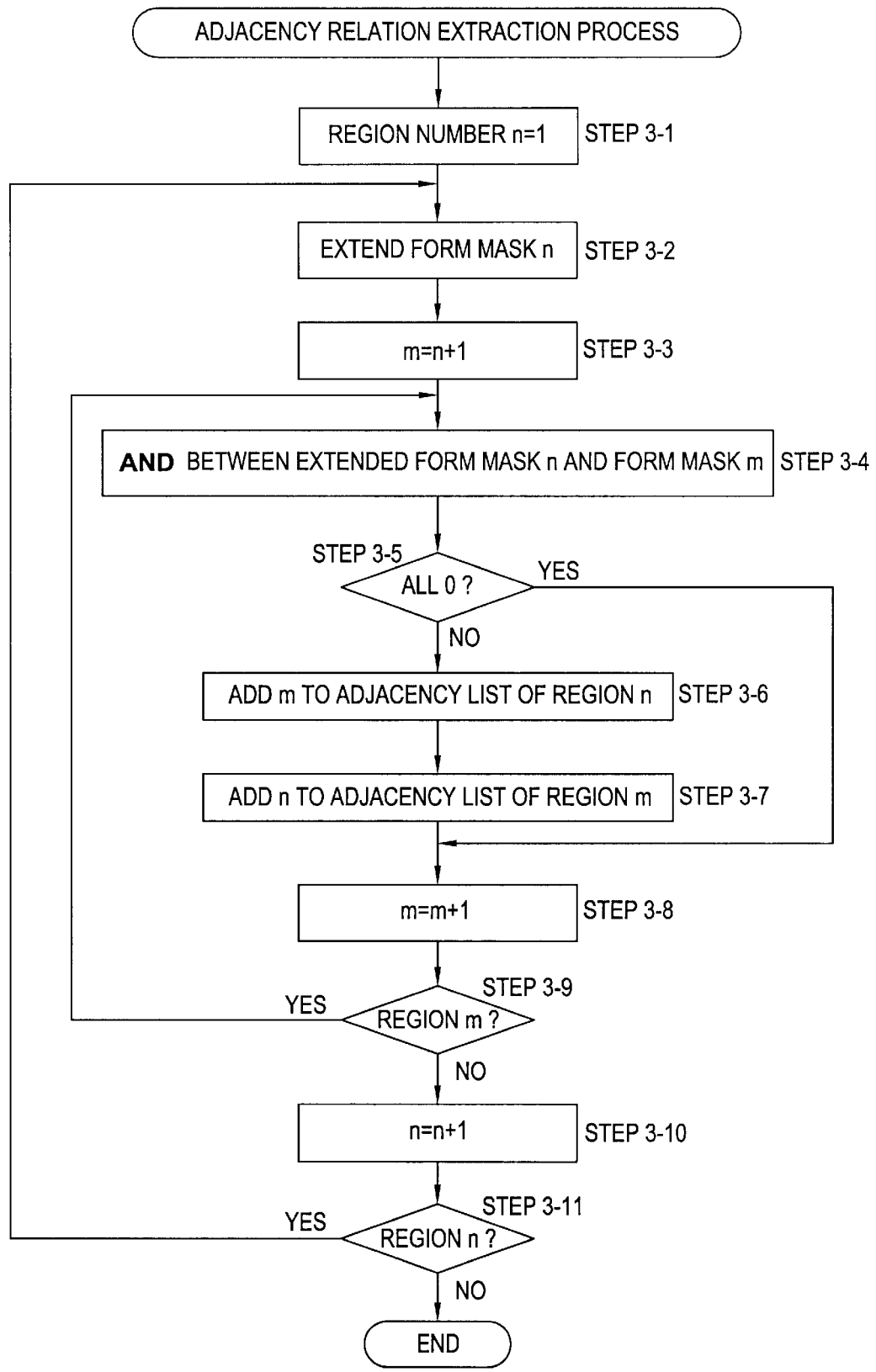
FIG. 4 shows a flow of adjacent relation extraction process.
Figure 5:
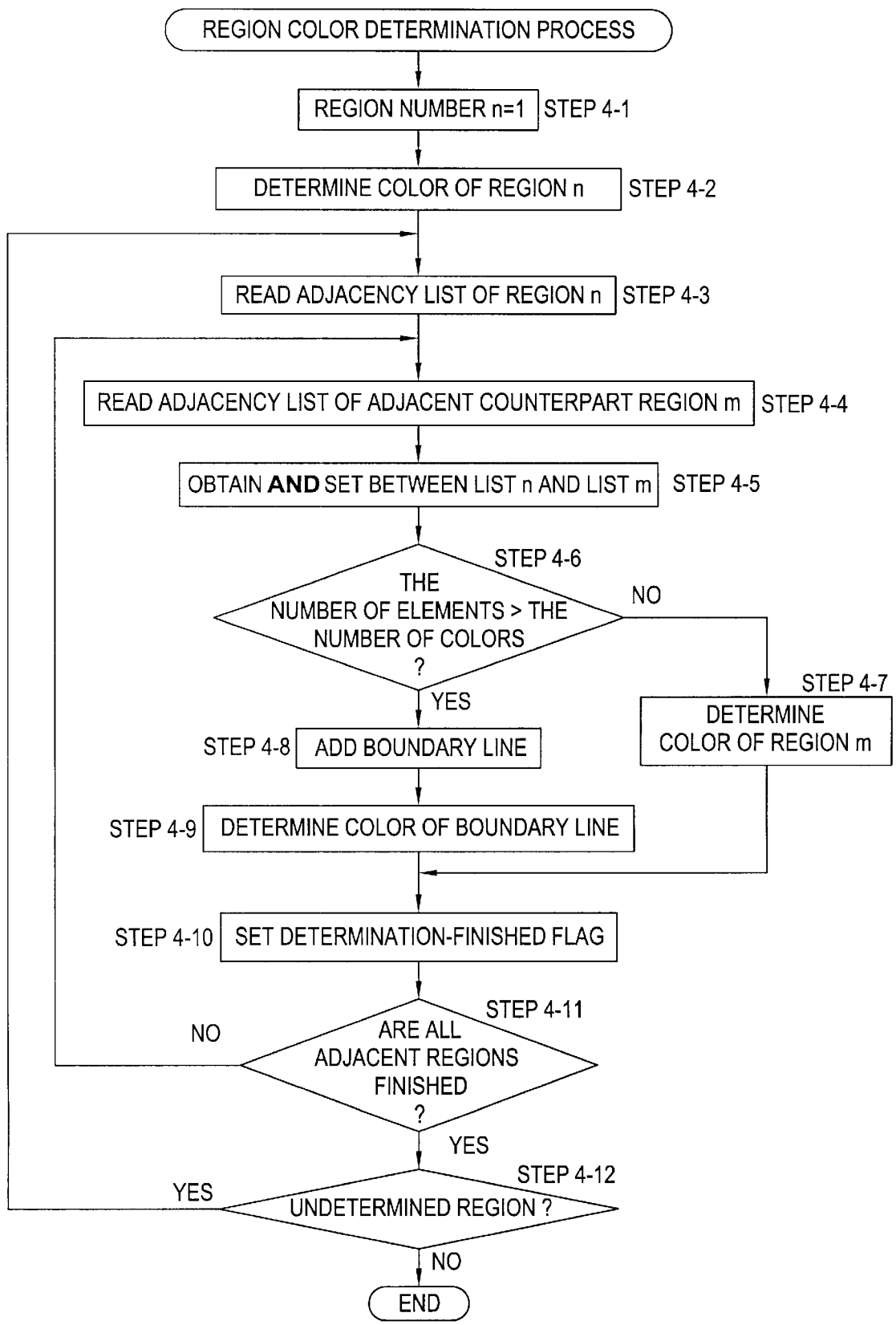
FIG. 5 shows a flow of region color determination process.
Figure 6:
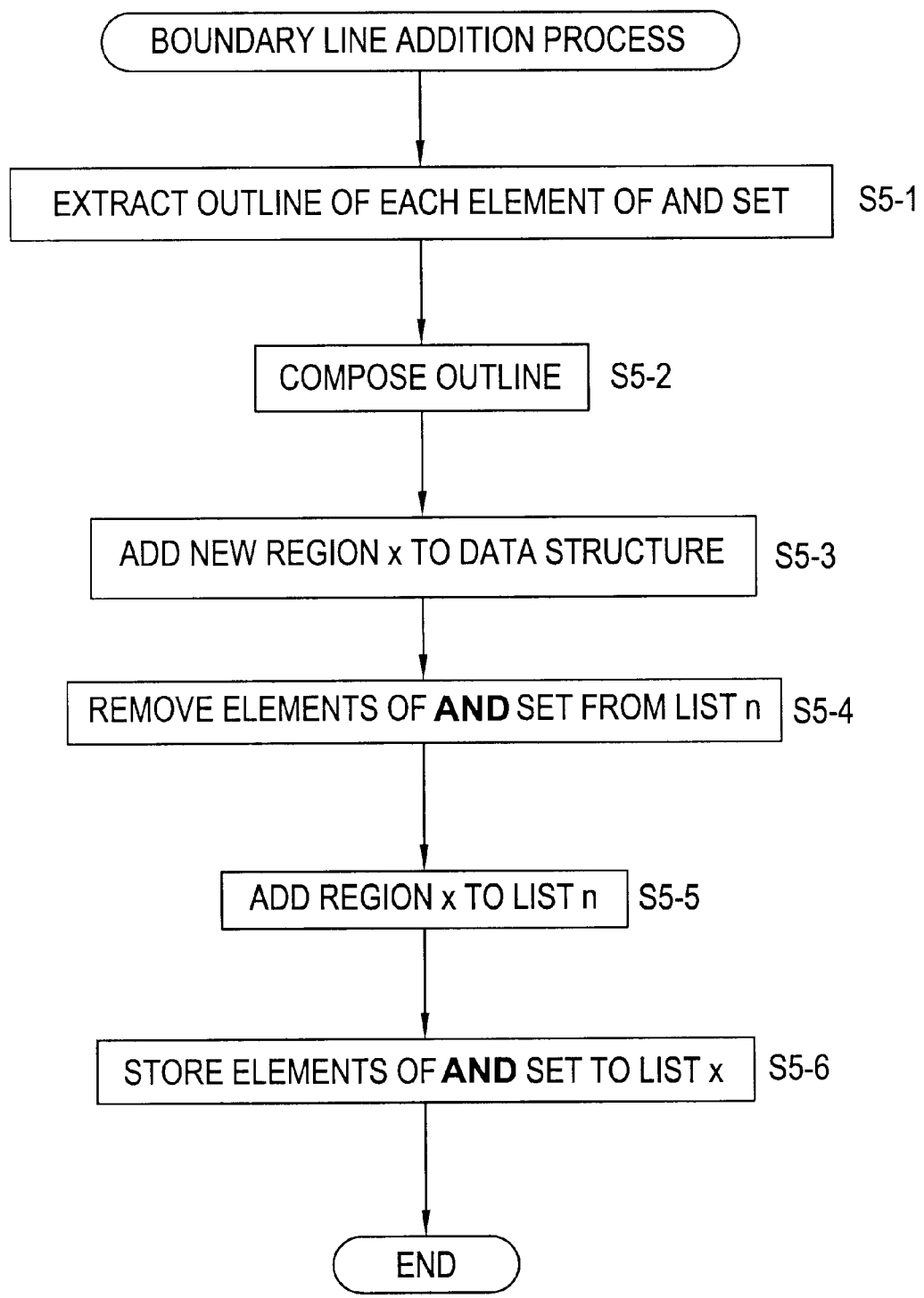
FIG. 6 shows a flow of boundary line addition process.

A processing flow chart schematically indicating the whole process of the color image conversion apparatus 1 is shown in FIG. 2. A processing flow chart of the region dividing means 11 is shown in FIG. 3, an adjacency relation extraction processing flow chart of the relation determination means 12 is shown in FIG. 4, a processing flow chart of the region color determination means 13 is shown in FIG. 5 and a processing flow chart of the boundary line addition means 14 is shown in FIG. 6.

Figure 7:
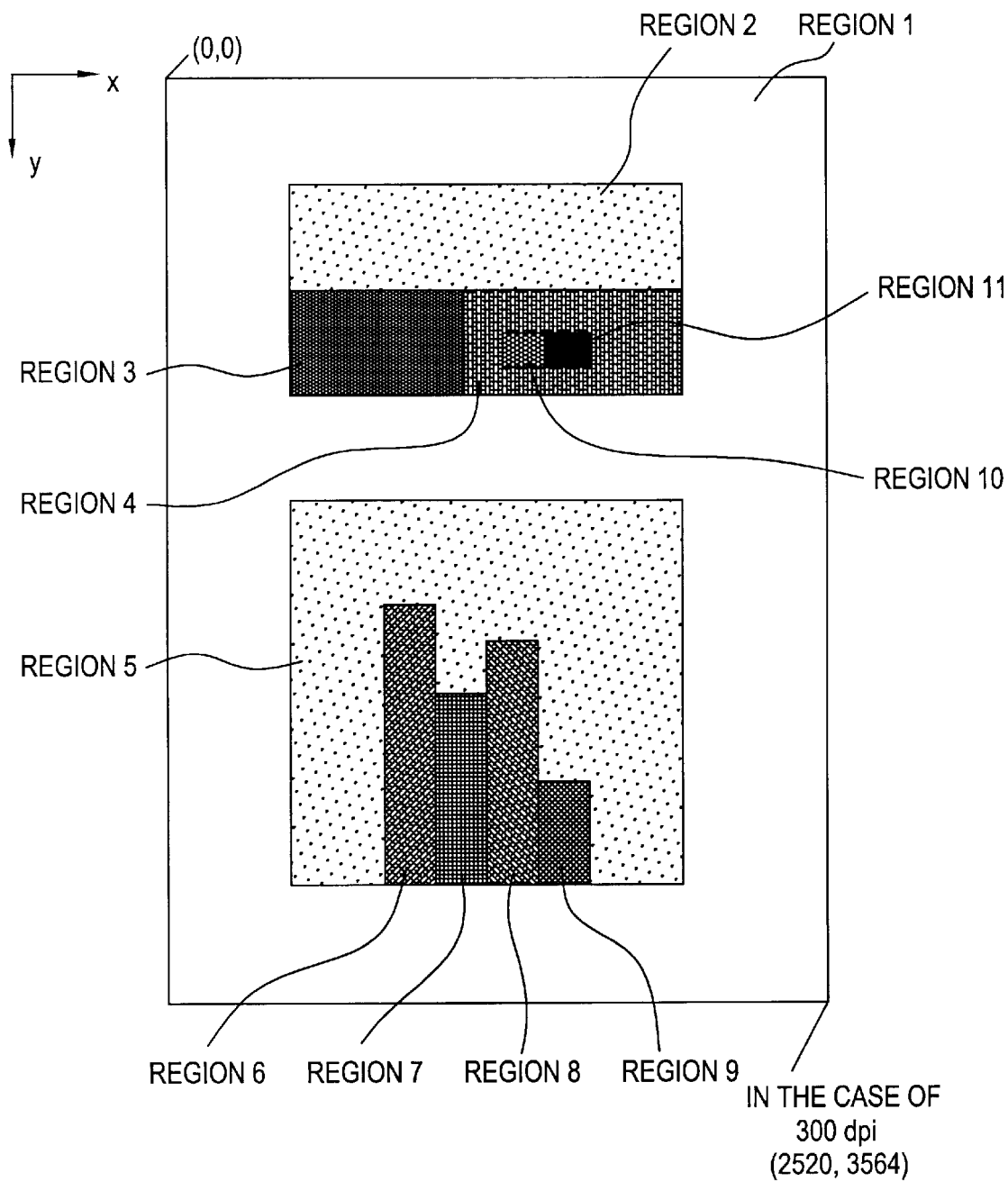
FIG. 7 shows an example of an input image.

First the user puts a document on the color image scanner 2 and selects the conversion function for the number of colors. As he/she presses the start button, the apparatus starts reading the document (steps 1-1, 1-2, 1-4 and 1-5). If the function for converting the number of colors is not selected, the ordinary copying process is executed (step 1-3). The read document is stored as a color image in a document image memory (not shown in the figure) constituted by a semiconductor memory or the like. An example of the input image is shown in FIG. 7. Hereinafter it is assumed, as shown in FIG. 7, that the coordinate in the left-to-right direction in the page is the x-coordinate and the coordinate in the upper-to-lower direction in the page is the y-coordinate. The current embodiment is explained using an example wherein the input document of A4 size is read by the image scanner of 300 dpi resolution. In the embodiment, the bottom right hand coordinate, namely, the maximum value of the coordinate is, the x-coordinate 2520 and y-coordinate 3564.

Next, the region dividing means 11 divides the input image so that a block of pixels having the same color constitutes one region (step 1-6). The detail of the region dividing process is shown in FIG. 3.

The region dividing means 11 first executes initialization of a determination-finished flag indicating whether the image is divided into regions and a queue (step 2-1). The queue temporarily stores a pixel which should be later processed and there is no problem in the order of the process, and accordingly, either FIFO or LIFO will do.

Then initialization of a same-color flag is carried out (step 2-2). The determination-finished flag and the same-color flag are identified with a blank bitmap image corresponding to the same size of the input image. It is assumed that only an initial-value of the same-color flag of the target pixel is 1 and those of the other pixels are 0. One method of selecting the target pixel is, for example, to select an uppermost pixel in an undivided image, and if there are plural uppermost pixels, a leftmost pixel among them should be selected. The target pixel in the initialized state is the uppermost-leftmost pixel in the image, namely, the origin (x=0, y=0).

Then comparison is executed between the color of the target pixel and those of pixels around four directions of the target pixel to which the same-color flags have not been set (step 2-3). In the case of the image read by the image scanner, the colors of pixels which should be originally the same sometimes slightly differ from one another because of, for example, reading error. Therefore, in comparing the colors of two pixels, in the case of RGB, pixels are respectively assumed to be i and j, and provided with threshold values for determination as shown in FIG. 8(*a*). The example of FIG. 8(*a*) means that the pixels i and j have the same color if a sum of squares of difference between the pixels i and j for each of RGB is less than a threshold value k. Instead of providing the threshold value for determination, it may be possible to quantize the image into some tens of colors as a preprocess utilizing an invention disclosed by Japanese Patent Application Unexamined Publication No. Sho. 62-105276. This process is unnecessary for an image edited and colored electronically.

Here, distance between two pixels i and j is calculated by squaring every difference in R. G and B between the pixels i and j, but the expression may also be as follows:

$$a(Ri-Rj)^2 + b(Gi-Gj)^2 + c(Bi-Bj)^2 < k$$

Among the coefficients a, b and c, it is desirable to make c less than both a and b because the element B less contributes than the other elements R and G do to cause the difference in color.

As a result of comparison in step 2-3, if there is at least one pixel determined to have the same color as that of the target pixel among surrounding four pixels to which the same-color flags have not been set, it is determined whether two or more pixels have the same color (step 2-4). If the determination results in two or more pixels, except for one pixel, they are stacked in the queue (step 2-5) and the remained one pixel is made to be a new target pixel and the same-color flag is set thereto (step 2-6). Thus the color comparing process between the new target pixel and pixels surrounding thereof is carried out again (steps 2-2 to 2-6).

As a result of comparison in step 2-3, if there is no pixel among surrounding four pixels to which the same-color flags have not been set determined to have the same color as that of the target pixel, whether the queue is empty or not is determined (step 2-7). If the queue is not empty, one pixel is fetched from the queue (step 2-8) and it is made to be a new target pixel and the same-color flag is set thereto (step 2-6) to carry out the color comparison process between the target pixel and the surrounding pixels again (steps 2-2 to 2-6).

If the determination in step 2-7 results in that the queue is empty, the result indicates that no pixel to be fetched is left in the region. Accordingly, OR carried out between the determination-finished flag and the same-color flag is made to be a new determination-finished flag (step 2-9).

Figure 9:
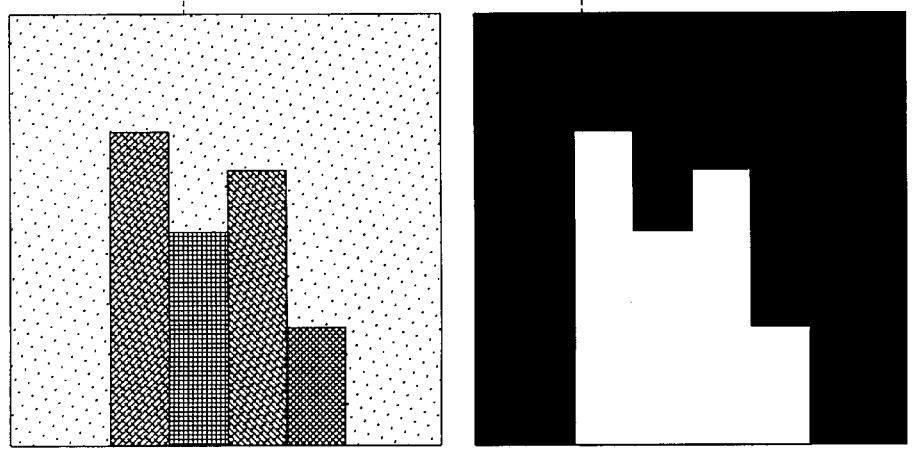
FIG. 9 shows an example of data structure.

Subsequently, a divided region is converted into a data structure represented by a region number 91, a circumscribing rectangle 92, image data (pointer) 93, a form mask (pointer) 94, the adjacency list (pointer) 95 and color determination data 96 as shown in FIG. 9 (step 2-10). The region number 91 is to identify the divided region, and the number indicating the order of division can be used, for example. The circumscribing rectangle 92 indicates the position of the region, which can be represented by upper and lower y-coordinates and left and right x-coordinates as shown in FIG. 9, provided that a rectangle having the sides in parallel with the coordinate axes is employed as the circumscribing rectangle. The same-color flag which has been obtained includes both coordinates and form as information; therefore it can be used in place of the form mask and circumscribing rectangle. However, even the data indicating the form alone requires the image memory sufficient for the number of regions, whereby the cost for the memory is increased, and consequently, here the position of the region is indicated by using the maximum and minimum values of each of x-coordinate and y-coordinate of the portion to which the same-color flag is set. The image data 93 is a partial image of the input image extracted by the circumscribing rectangle. The form mask 94 is the same-color flag extracted by the circumscribing rectangle, which is identified with the bitmap image wherein the portion of pixels included in the region is 1 and the portion not included in the region is 0. The adjacency list 95 is a storing region for storing the result of the adjacency relation extraction process and the region number 91 of the adjacent region is stored therein. The adjacency list is empty when the region dividing process is finished. The color determination data 96 is a storing region for storing the result of processing of the region color determination means 16, and is also empty when the region dividing process is finished.

In this embodiment, the storing region is held in the region dividing means 11 and initially stores 0 which indicates the status that the adjacency relation and region color are not determined. The storing region may be added prior to each process. To make the data search easy, it is provided in this embodiment that the data structure is a fixed length format, and the image data 93, form mask 94 and adjacency list 95 store the pointer to the actual data.

After the conversion into data structure is finished, undivided pixels are searched for based on the determination-finished flag (step 2-11), and if there is at least one undivided pixel, new target pixel is selected and the same-color flag is initialized to execute division of new regions. If no undivided pixel is left, obtained data structure is transferred to the relation determination means 12 which comprises the contact point set extracting means 121, the adjacency relation determination means 122 and the adjacency relation storing means 123.

On receiving the data structure, the relation determination means 12 examines whether the regions are adjacent to each other for all possible combinations of divided two regions. The detail of operation of the adjacency relation extraction process is shown in FIG. 4.

First the region of the region number 1 (region number n=1) is selected and transferred to the contact point set extracting means 121 (step 3-1). The contact point set extracting means 121 extends the form mask by 1 dot and transfers it to the adjacency relation determination means 122 (step 3-2). The extension of the form mask can be realized with ease by the method such as carrying out OR between two of the surrounding four pixels for each pixel showing the form mask.

The adjacency relation determination means 122 carries out AND between the extended form mask and the form mask of the region of region number 2 (generally, n+l) (step 3-4). Instead of carrying out AND between possible pairs among all regions, the combination of regions clearly not adjacent to each other known by the positional information of the circumscribing rectangle can be skipped to reduce the cost of operation, for example, in such a case where the maximum value of x-coordinate of one region is smaller than the minimum value of x-coordinate of another region. In the example shown in FIG. 8(*b*), the maximum value of x-coordinate of the left side region (20) is smaller than the minimum value of x-coordinate of the right side region (30), and therefore these two regions have no overlapping portion.

FIG. 10 shows the example of extraction of the contact point set, in which hatched portions indicate two target regions. As a result of AND operation, as shown in FIG. 10, the presence of the bit being 1 indicates that there is at least one contact point; accordingly, each region number is transferred to the adjacency region storing means 123.

It is determined whether all the bits are 0 or not (step 3-5), and if all of the bits are 0, the regions are not adjacent to each other; therefore the process proceeds to next region (region number 3). When the block of the contact points is extremely small, such as the case where the apexes of figures are in contact with each other, it may be determined that there is no adjacency relation. The number of colors used for coloring and distinguishing is determined more strictly based on the adjacency determination such that even the block of contact points corresponding to only one pixel indicates adjacency. Accordingly, the present embodiment is explained using an example in which the block of contact points corresponding to only one pixel is determined to indicate adjacency.

Figure 11:
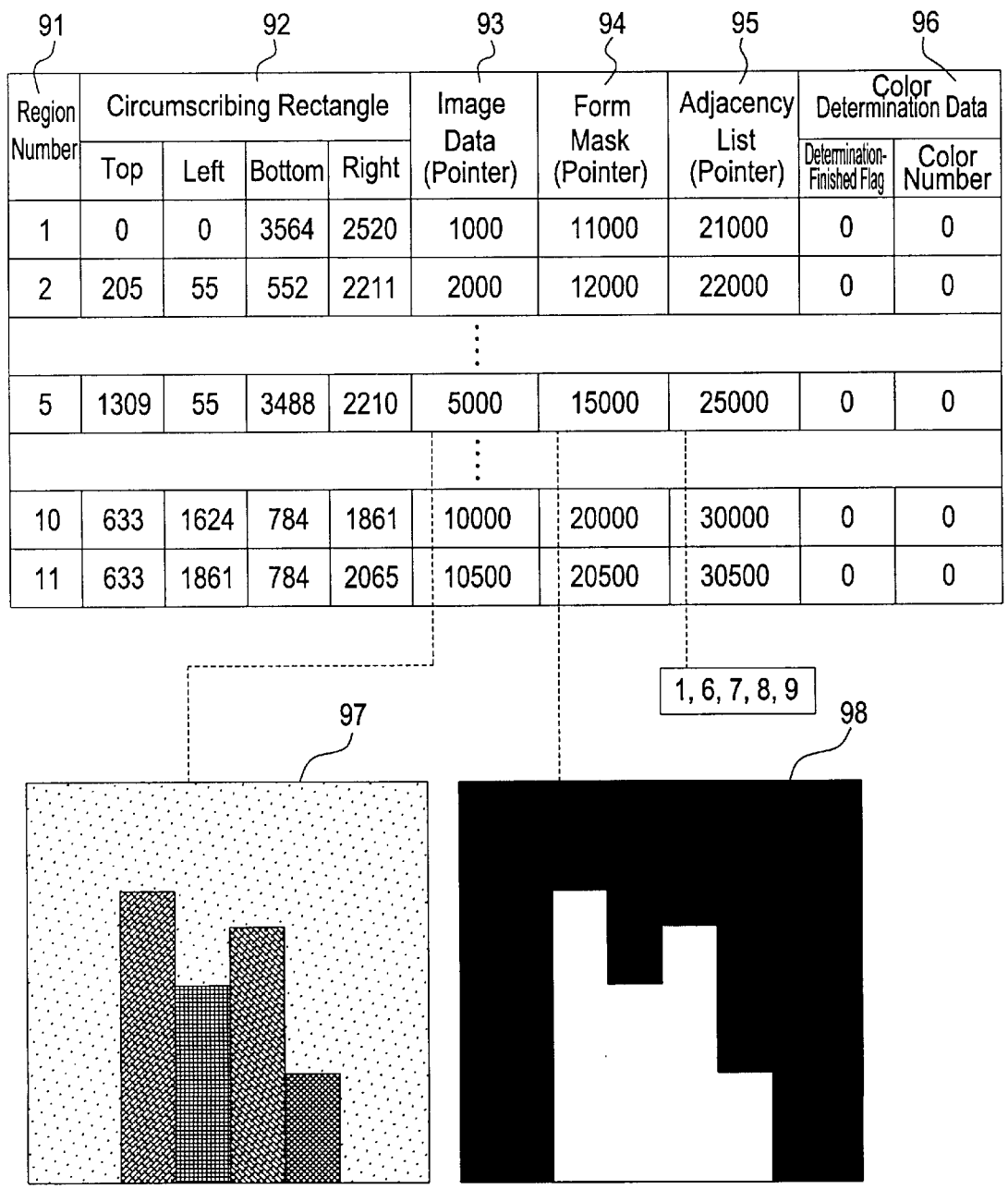
FIG. 11 shows an example of data structure in which the adjacency list is stored.

The adjacent region storing means 123 adds n to the adjacency list of region m, and adds m to the adjacency list of region n, assuming that the transferred region numbers are m and n (steps 3-6 to 3-7). In the example of FIG. 10, since region 1 and region 2 are adjacent to each other, 2 is added to the adjacency list of region 1 and 1 is added to the adjacency list of region 2. Repetition of these processes for region n over the range from region n+l to the last region (steps 3-8 to 3-9 and 3-10 to 3-11), the adjacency relation in all possible combinations of divided two regions can be examined. The data structure updated in this way is transferred to the region color determination means 13. FIG. 11 shows an example of data structure in which the adjacency list is stored.

The region color determination means 13 assigns a color to each of the regions with reference to the adjacency list. It is assumed that the region which is first referred to in the list is the background because it is unnecessary to add the boundary line to the outside of the background, and therefore convenient to determine the color, and moreover, the background has the highest probability of occupying the largest area and quite naturally being assigned a lightest color, namely white; consequently, color can be easily specified. However, from the viewpoint of the area, a method may be employed in which identifiers such as numbers are substituted for colors, and the area of each number is summed after the determination of numbers indicating all region colors, thus allotting white to the number occupying the largest area. In the region dividing method of the present embodiment, since the background color is divided first, assumption that the initial value of the region number is made to be 1 has the same effect as making the background a target. If a different region dividing method is employed, the region number 1 does not always correspond to the background, but the process can be started with the target region located nearest to the end portion.

Here, the light color means the color of low density. Generally the color can be represented by value, chroma and hue, and in particular, the density is greatly influenced by value and chroma. Therefore, determination of region color can be executed by the following algorithm.

Step 1) Select a color of high value as a light color from the colors which can be represented by the printer 3.

Step 2) If there are plural colors of the same value in the colors represented by the printer 3 in step 1, select the color of chroma whose value is the closest to the middle value (to be more concrete, if the chroma is represented by 8-bit, the color having chroma whose value is the closest to 128).

The region color determination means 13 updates the color determination data. The color determination data consists of the storing region for storing the number of determined region color and the determination-finished flag indicating whether the region color number is determined.

Detailed flow chart of processing of the region color determination means 13 is shown in FIG. 5. First the target region n is initialized (step 4-1) and the color of the target region n is determined (step 4-2). Next, the adjacency list of the target region n is read (step 4-3) and one of the regions stored in the list is further selected, and the adjacency list of the region is read (step 4-4). Then the AND set is obtained between the sets of region numbers stored in the two adjacency list plus their own region number (step 4-5). FIG. 12 shows an example of reading the adjacency lists and obtaining AND set. In the example, the adjacency list 121 of the region 1 and the adjacency list 122 of the region 2 stored in the adjacency list 121 of the region 1 are read, and adjacency lists 123 and 124 are prepared by adding their own numbers in the lists 121 and 122, respectively to obtain a list 125 which is an AND set between the sets of region numbers. The AND set indicates the regions which are adjacent to one another, and in this embodiment, it is indicated that the regions 1, 2, 3 and 4 are adjacent to one another.

To color and distinguish the elements of the AND set, colors of the same number as that of the elements are required. It is determined whether the number of elements exceeds the number of colors (step 4-6). If the number of elements is the same or less than the number of colors, colors can be assigned without additional processing (step 4-7). In the case where two colors are used, the color different from the color already determined is assigned. In the case where three or more colors are to be used, several assigning methods can be used such as assigning in the order of determination or utilizing random number. One of those method examines the area of each region, namely, the number of pixels of the form mask, and assigns the lightest color to the region of the largest number of pixels, the next lightest color to the region of the next largest number of pixels, and so forth. According to the method, the large area region can be assigned the light color, thus making the finest and impressive document. In this embodiment, it is assumed that white, black and +1 color (e.g., blue) are assigned in this order to the regions in the ascending order of the region numbers. For instance, assuming that three regions, region 10, region 15 and region 20 are adjacent to one another, white, black and blue are assigned to region 10, region 15 and region 20, respectively. To indicate that the colors have been assigned, the determination-finished flag for the element of the AND set is set (step 4-10).

If the number of the elements exceeds the number of colors, it is impossible to color and distinguish the regions. However, if one boundary line is added to the contacting portion between the regions, each of the regions only contacts the boundary line, and therefore at least two colors are sufficient for enabling the coloring and distinguishing.

Thus the AND set is transferred to the boundary line addition means 14 to receive a data structure to which the boundary line is added (step 4-8). In this case, a color is assigned to the boundary line (step 4-9), and the determination-finished flag is set to the boundary line (step 4-10).

When the region colors are assigned and colors of all adjacent regions are determined (YES in step 4-11), regions whose colors are left undetermined are searched for, and if all region colors are determined, the process is finished (step 4-12).

Figure 13:
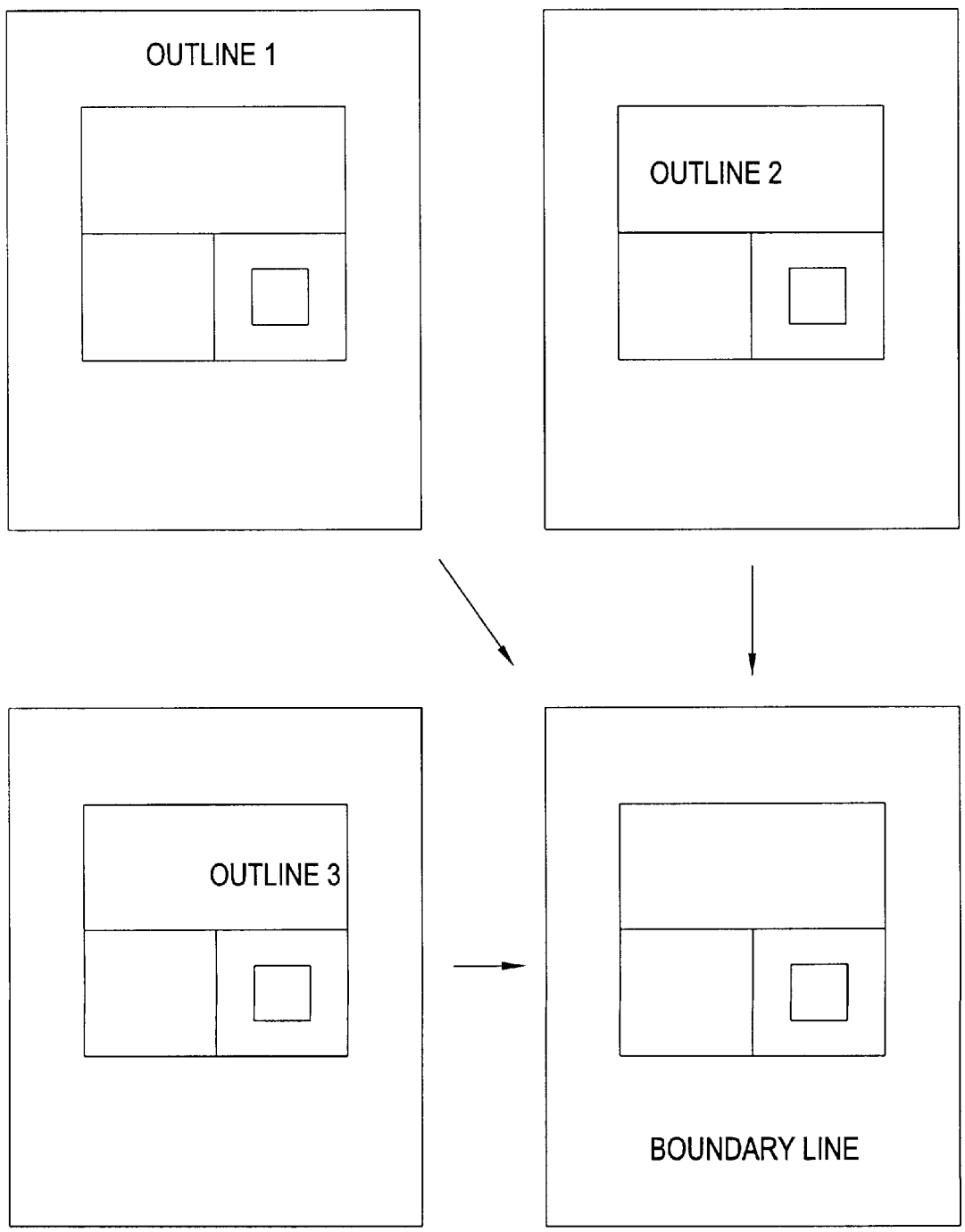
FIG. 13 shows an example of calculation for a boundary line in the image of FIG. 10.

FIG. 6 shows the flow chart of processing of the boundary line addition. The boundary line addition means 14 comprises the boundary line image generation means 141, the boundary line region storing means 142 and the adjacent region changing means 143. On receiving the AND set, the boundary line image generation means 141 extracts outlines of all regions to which the determination-finished flag for the AND set is not set (step 5-1). Since only the outside edge is required here, general edge extraction may be employed. The same result can be obtained by carrying out AND between the original form mask and another factor provided by removing the portion corresponding to the original form mask from an extended form mask generated by the same method as that of the contact point set extracting means 121 and extracting the outside linkage which is left behind and thickening the linkage by a few dots. The number of dots to be extended is determined so that the width of the line is approximately in the range from 0.1 mm to 1.0 mm in accordance with the resolution of the input document image. The boundary line can be obtained by carrying out OR among the outlines of regions of the AND set (step 5-2). FIG. 13 shows an example of obtaining the boundary line in the image of FIG. 10.

The obtained boundary line is added to the end of the data structure as a new region in the boundary line region storing means 142 (step 5-3). The circumscribing rectangle, image data and form mask are easily available based on the obtained boundary line.

The adjacency list is changed by the adjacency region changing means 143. Assuming that the region to which the determination-finished flag for the region of the AND set is set, that is, the region located outside of the boundary line is n, the change is realized by removing elements of the AND set from the adjacency list of the region n (step 5-4), adding a boundary line region x instead (step 5—5), and storing elements of the AND set including the region n in the adjacency list of the boundary line region x (step 5-6).

Figure 14:
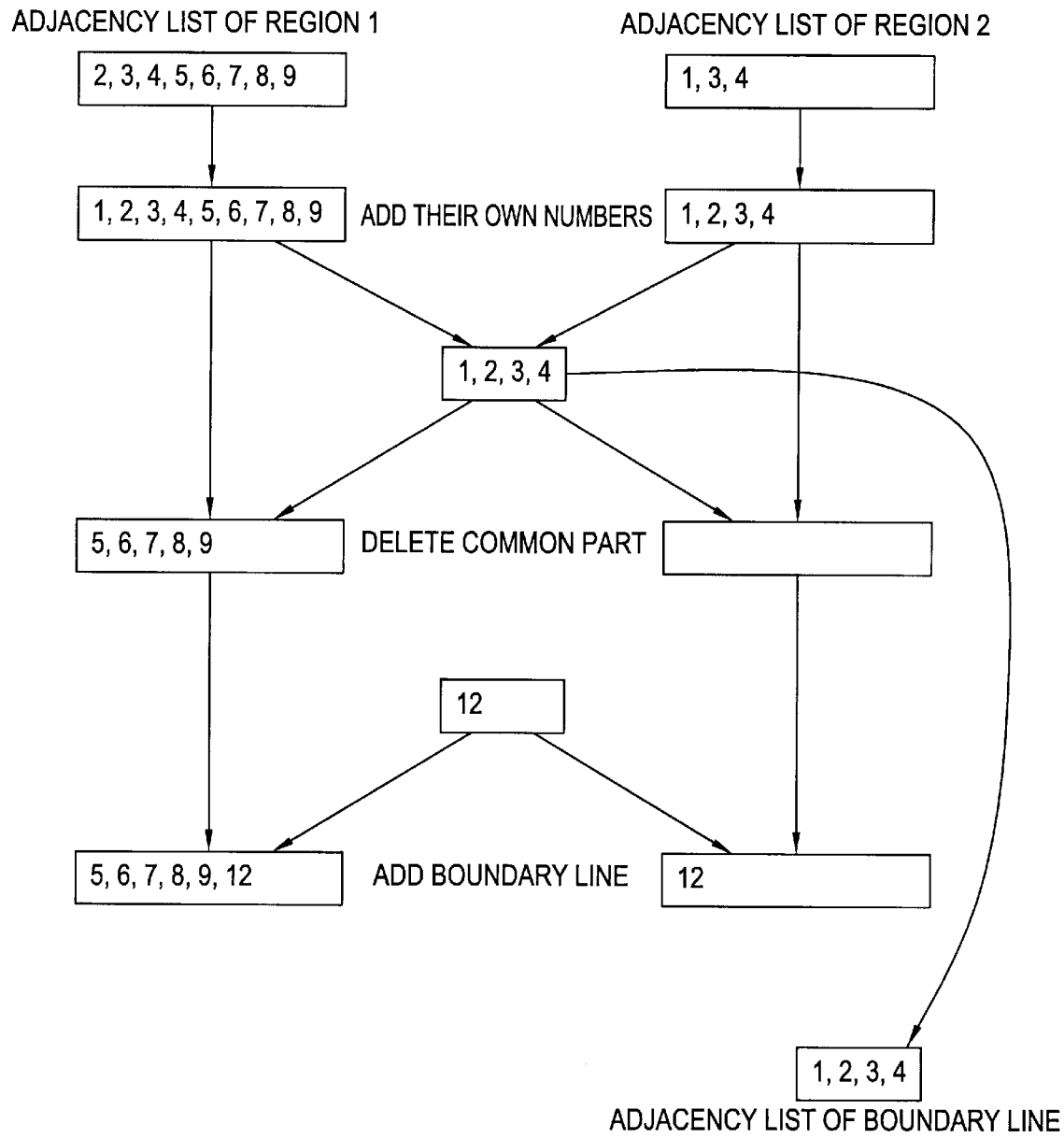
FIG. 14 illustrates change of the adjacency list in the case where a boundary line region is added to the adjacency list shown in FIG. 12.

FIG. 14 illustrates the change of the adjacency list in the case where the boundary line region is added to the adjacency list shown in FIG. 12.

Figure 15:
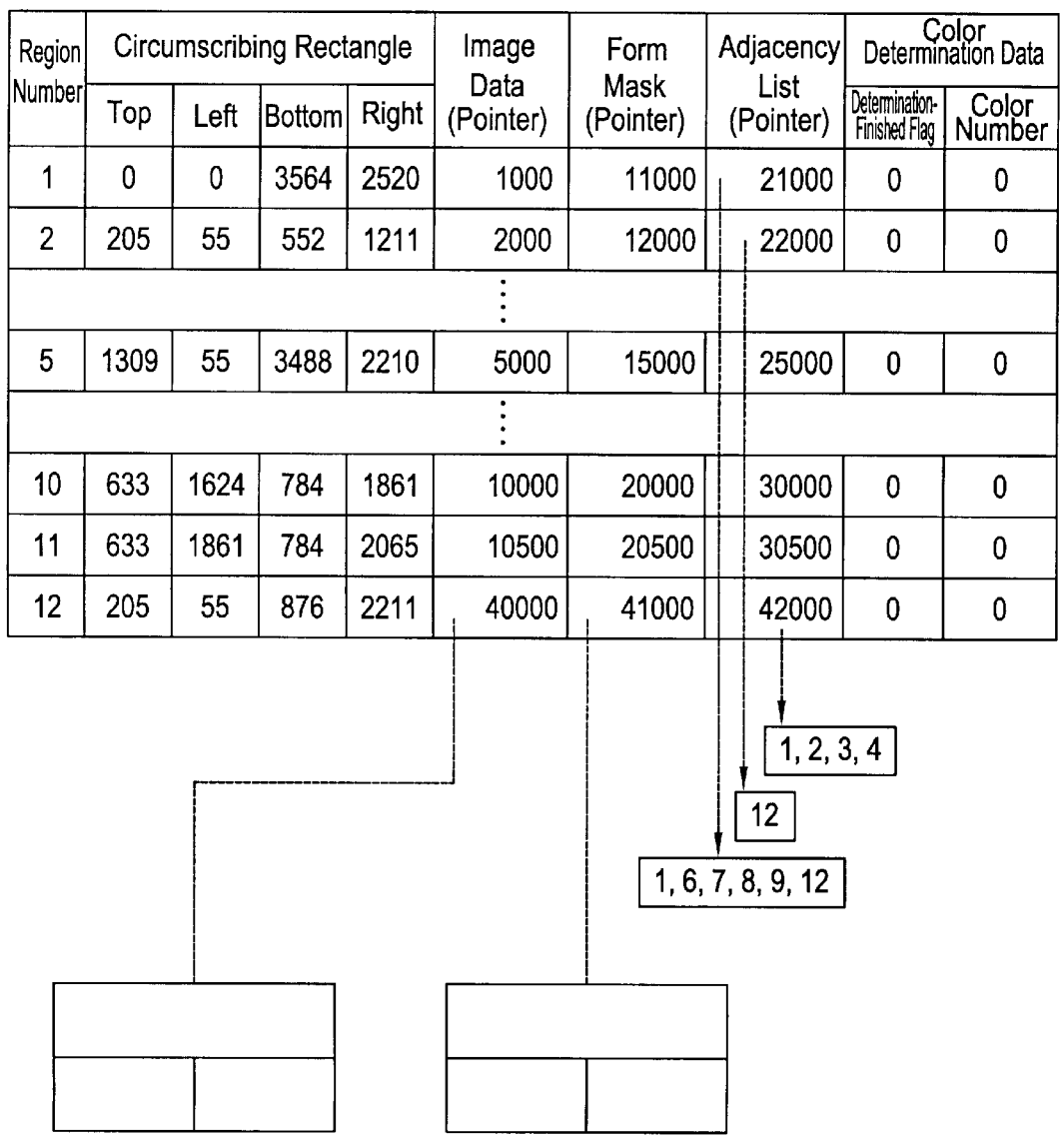
FIG. 15 shows an example of data structure to which the boundary line region shown in FIG. 14 is added.

An example of data structure to which the boundary line region of FIG. 14 is shown in FIG. 15. In the same way, FIG. 16 shows an example in which the input image shown in FIG. 7 is converted into an image of three colors. Here, regions of number 12 and 13 are added as the boundary line.

Figure 17:
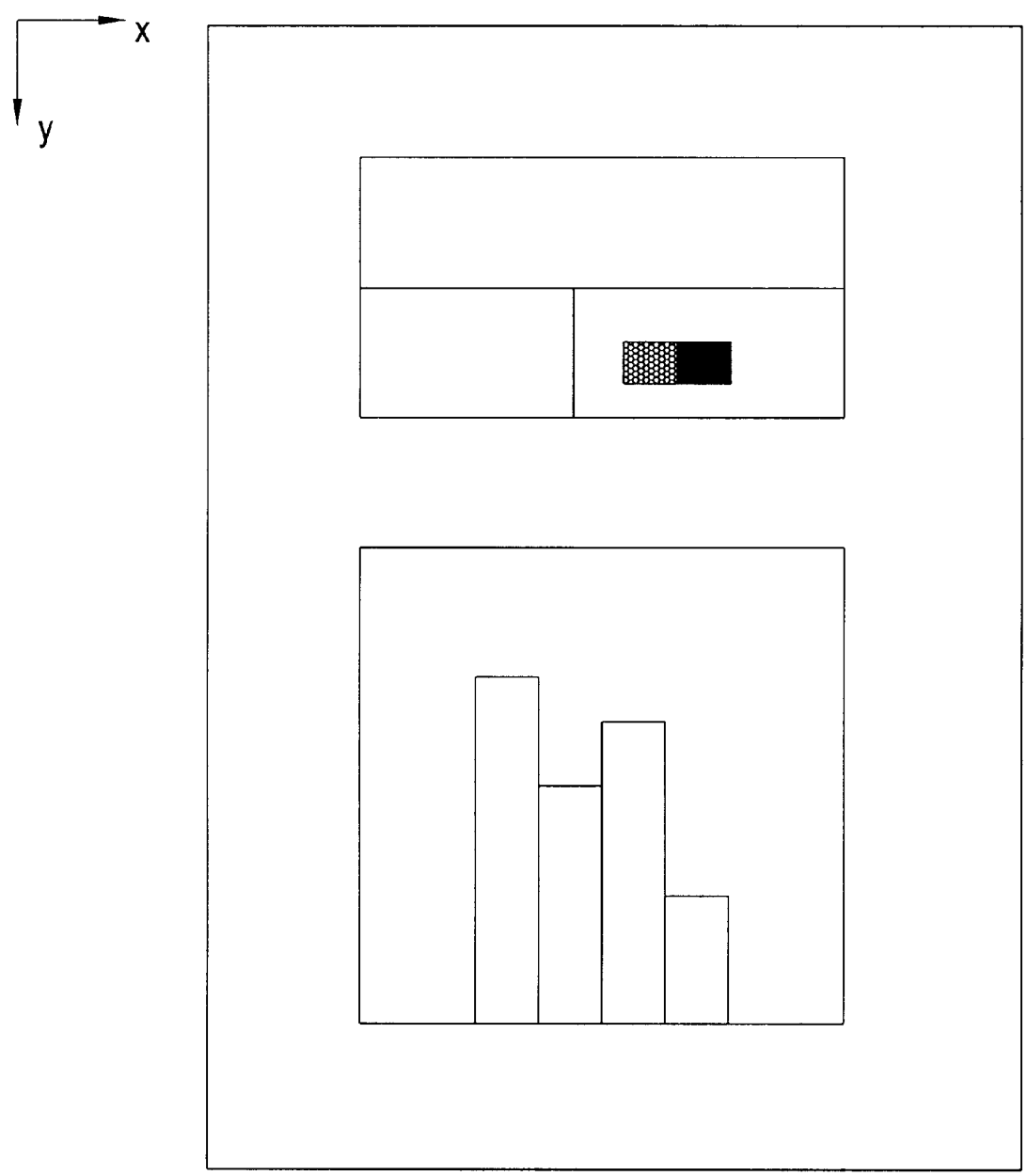
FIG. 17 shows an example of an output image in the case where the input image shown in FIG. 7 is colored and distinguished by three colors.

The data structure whose region color has thus been determined is transferred to the output image generation means 15. The output image generation means 15 generates an output image based on the form mask and region color in the data structure and transfers the generated image to the output device such as a printer. FIG. 17 is an example of the output image in the case where the input image of FIG. 7 is converted into the three-color image. Thus the output can be obtained in which the number of colors has been changed.

In the embodiment described above, the object of the process is a color image of N-color as the input image and regions of the image is distinguished based on colors so as to determine the region colors for the distinguished regions. However, the present invention can be applied to a monochrome image having N-gradation such as a monochrome photographic image. In such a case, the apparatus can be constructed so that the regions are distinguished in accordance with density and converted into a monochrome image of a predetermined number of gradations which is less than N or a color image of a predetermined number of colors which are less than N.

The algorithm of the image conversion processing shown in the above embodiment can be implemented by a program, and it is possible to store the program in a recording medium as a physical substance, for example, a floppy-disk or a CD-ROM. The program stored in the recording medium is readable by a computer and is capable of controlling the computer when used in it. A color scanner can be connected to the computer as the input device of a color image, and a display such as a CRT or a printer which outputs predetermined colors can be connected as the output device.

The algorithm of the above embodiment can also be applied to a copying machine, wherein the algorithm of the image conversion processing is stored in a ROM as a program to control a microprocessor in the copying machine. The ROM is changeable.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image conversion apparatus comprising:

color image inputting means for inputting a color image of N-color;

region detecting means for detecting plural regions having the same color in said color image input by said color image inputting means;

adjacency determination means for determining whether a first region and another region detected by said region detecting means are adjacent to each other; and boundary line addition means for adding a boundary line to said first region, said boundary line being an outline of said first region, if the number of regions determined by said adjacency determination means to be adjacent to said first region is more than M, wherein N is a natural number equal to or more than 3 and M is a natural number less than N and equal to or more than 2.

2. The image conversion apparatus according to claim 1, further comprising:

color conversion means for converting the colors of said first region and said another region determined by said adjacency determination means to be adjacent to each other into colors different from each other if the number of said regions determined by said adjacency determination means to be adjacent to said first region is less than M.

3. The image conversion apparatus according to claim 1, wherein said adjacency determination means comprises:

region extension means for extending said first region detected by said region detecting means;

AND means for carrying out AND between said first region extended by said region extension means and said another region detected by said region detecting means; and determination means for determining said first region extended by said region extension means and said another region detected by said region detecting means to be adjacent to each other if a result of AND carried out by said AND means is true.

4. The image conversion apparatus of claim 1, wherein the boundary line addition means further comprises counting means for incrementing a value based on a determination in the adjacency determination means.

5. An image conversion apparatus comprising:

color image inputting means for inputting a color image of N-color;

region detecting means for detecting plural regions having the same color in said color image input by said color image inputting means;

adjacency determination means for determining whether a first region and another region detected by said region detecting means are adjacent to each other; and color conversion means for converting the colors of said first region and said another region determined by said adjacency determination means to be adjacent to each other into colors different from each other if the number of said regions determined by said adjacency determination means to be adjacent to said first region is less than M, wherein N is a natural number equal to or more than 3 and M is a natural number less than N and equal to or more than 2.

6. The image conversion apparatus according to claim 5, further comprising:

color image generating means for generating a color image comprising said region whose color is converted by said color conversion means; and color image output means capable of outputting an M-color image for outputting said color image generated by said color image generating means.

7. The image conversion apparatus according to claim 5, wherein said adjacency determination means comprises:

region extension means for extending said first region detected by said region detecting means;

AND means for carrying out AND between said first region extended by said region extension means and another region detected by said region detecting means; and determination means for determining said first region extended by said region extension means and said another region detected by said region detecting means to be adjacent to each other if a result of AND carried out by said AND means is true.

8. The image conversion apparatus according to claim 5, further comprising:

area measuring means for measuring an area of each of said plural regions detected by said region detecting means; and said color conversion means converting the colors of said first region and each of said regions determined by said adjacency determination means to be adjacent to said first region into colors different from one another in accordance with differences in areas of said regions measured by said area measuring means.

9. The image conversion apparatus according to claim 8, wherein said color conversion means converts the color of a region having a larger area into a color of a lower density in accordance with the result of measuring areas of regions by said area measuring means.

10. The image conversion apparatus of claim 5, wherein the boundary line addition means further comprises counting means for incrementing a value based on a determination in the adjacency determination means.

11. An image conversion apparatus comprising:

image inputting means for inputting a monochrome image of N-gradation;

region detecting means for detecting plural regions having the same gradation in said monochrome image input by said image inputting means;

adjacency determination means for determining whether a first region and another region detected by said region detecting means are adjacent to each other; and boundary line addition means for adding a boundary line to said first region, said boundary line being an outline of said first region, if the number of regions determined by said adjacency determination means to be adjacent to said first region is more than M, wherein N is a natural number equal to or more than 3 and M is a natural number less than N and equal to or more than 2.

12. The image conversion apparatus of claim 11, wherein the boundary line addition means further comprises counting means for incrementing a value based on a determination in the adjacency determination means.

13. An image conversion method comprising the steps of:

a) inputting a color image of N-color;

b) detecting plural regions having the same color in said color image input in step a);

c) determining whether a first region and another region detected in step b) are adjacent to each other; and d) adding a boundary line to said first region, said boundary line being an outline of said first region, if the number of said regions determined in step c) to be adjacent to said first region is more than M, wherein N is a natural number equal to or more than 3 and M is a natural number less than N and equal to or more than 2.

14. The image conversion of claim 13 further comprising incrementing the value M the first region and the other region are determined to be adjacent to each other.

15. An image conversion method comprising the steps of:

a) inputting a color image of N-color;

b) detecting plural regions having the same color in said color image input in step a);

c) determining whether a first region and another region detected in step b) are adjacent to each other; and d) converting the colors of said first region and said another region determined by said adjacency determination means to be adjacent to each other into colors different from each other if the number of said regions determined by said adjacency determination means to be adjacent to said first region is less than M, wherein N is a natural number equal to or more than 3 and M is a natural number less than N and equal to or more than 2.

16. The image conversion of claim 15 further comprising incrementing the value M the first region and the other region are determined to be adjacent to each other.

17. A recording medium readable by a computer having color image inputting means for inputting a color image of N-color, said recording medium storing a program for making said computer carry out image conversion of said color image input by said color image inputting means, said program including instructions for executing the following processes of:

a) detecting plural regions having the same color in said color image input by said color image inputting means;

b) determining whether a first region and another region detected in process a) are adjacent to each other; and c) adding a boundary line to said first region, said boundary line being an outline of said first region, if the number of said regions determined in process b) to be adjacent to said first region is more than M, wherein N is a natural number equal to or more than 3 and M is a natural number less than N and equal to or more than 2.

18. The image conversion of claim 17 further comprising incrementing the value M first region and the other region are determined to be adjacent to each other.

19. A recording medium readable by a computer having color image inputting means for inputting a color image of N-color, said recording medium storing a program for making said computer carry out image conversion of said color image input by said color image inputting means, said program including instructions for executing the following processes of:

a) detecting plural regions having the same color in said color image input by said color image inputting means;

b) determining whether a first region and another region detected in process a) are adjacent to each other; and c) converting the colors of said first region and said another region determined in process b) to be adjacent to each other into colors different from each other if the number of said regions determined process b) to be adjacent to said first region is less than M, wherein N is a natural number equal to or more than 3 and M is a natural number less than N and equal to or more than 2.

20. The image conversion of claim 19 further comprising incrementing the value M the first region and the other region are determined to be adjacent to each other.

* * * * *